United States Patent
Luo

(10) Patent No.: US 7,249,299 B1
(45) Date of Patent: Jul. 24, 2007

(54) BIDIRECTIONAL HORIZONTAL SCAN CIRCUIT WITH SUB-SAMPLING AND HORIZONTAL ADDING FUNCTIONS

(75) Inventor: Qiang Luo, Santa Clara, CA (US)

(73) Assignee: Eastman Kodak Company, Rochester, NY (US)

( * ) Notice: Subject to any disclaimer, the term of this patent is extended or adjusted under 35 U.S.C. 154(b) by 773 days.

(21) Appl. No.: 10/641,605

(22) Filed: Aug. 15, 2003

(51) Int. Cl.
*G01R 31/28* (2006.01)
(52) U.S. Cl. .................. 714/726; 345/55; 358/505
(58) Field of Classification Search ............... 348/97, 348/230.1; 358/500, 1.18, 505; 345/60, 345/87, 55; 257/349, 292; 714/726
See application file for complete search history.

(56) References Cited

U.S. PATENT DOCUMENTS

| | | | | |
|---|---|---|---|---|
| 5,157,482 A | * | 10/1992 | Cosgrove | 348/97 |
| 5,477,345 A | * | 12/1995 | Tse | 358/500 |
| 6,127,992 A | * | 10/2000 | Sano | 345/60 |
| 6,346,991 B1 | * | 2/2002 | Amidei | 358/1.18 |
| 6,410,961 B1 | * | 6/2002 | Hayashi | 257/349 |
| 6,646,680 B1 | * | 11/2003 | Mead et al. | 348/230.1 |
| 6,922,183 B2 | * | 7/2005 | Ting et al. | 345/87 |
| 6,927,433 B2 | * | 8/2005 | Hynecek | 257/292 |

* cited by examiner

*Primary Examiner*—David Ton
(74) *Attorney, Agent, or Firm*—Peyton C. Watkins

(57) ABSTRACT

A horizontal scan circuit comprises a column selector and a plurality of block selectors. A column selector is used to address particular columns of pixels within blocks. A block selector is used to select a particular block and to select the particular columns of the selected block that are addressed by the column selector. Each block selector typically comprises a single D-type flip-flop that is associated with a block of pixel columns. The block selectors are arranged such that the blocks can be scanned from left-to-right or right-to-left. The column selector comprises an asynchronous counter and a decoder that are further arranged to provide sub-sampling and horizontal adding functions. The use of block and column selectors reduces the number of relatively large D-type flip-flops (which conserves die area) and reduces the parasitic capacitance associated with the otherwise required relatively large number of inputs of the column selection circuit drivers.

20 Claims, 4 Drawing Sheets

BIDIRECTIONAL HORIZONTAL SCAN CIRCUIT WITH SUB-SAMPLING AND HORIZONTAL ADDING FUNCTIONS

FIELD OF THE INVENTION

The present invention relates generally to electronic image sensors, and more particularly to scan circuitry for CMOS image sensors.

BACKGROUND OF THE INVENTION

Electronic image sensors are widely used to produce video and photographic images. The electronic image sensors typically comprise pixel sensors that are arranged in an array of rows and columns. The image sensors typically read pixel values by using a horizontal scan circuit to sequentially address pixel columns. A charge amplifier is often used to read the charge of pixels of the pixel columns as the pixels are addressed by the horizontal scan circuit.

Conventional pixel arrays are arranged with a relatively large D-type flip-flop being associated with each column of pixels. As pixel sizes ("pitches") decrease, it is becoming correspondingly more difficult to efficiently arrange the D-type flip-flops and/or pixel columns on the image sensor die wherein each flip-flop is associated with an individual pixel column.

An appreciation of the present invention and its improvements can be obtained by reference to the accompanying drawings, which are briefly summarized below, to the following detailed description of illustrated embodiments of the invention, and to the appended claims.

DETAILED DESCRIPTION OF THE PREFERRED EMBODIMENT

Figure 1:
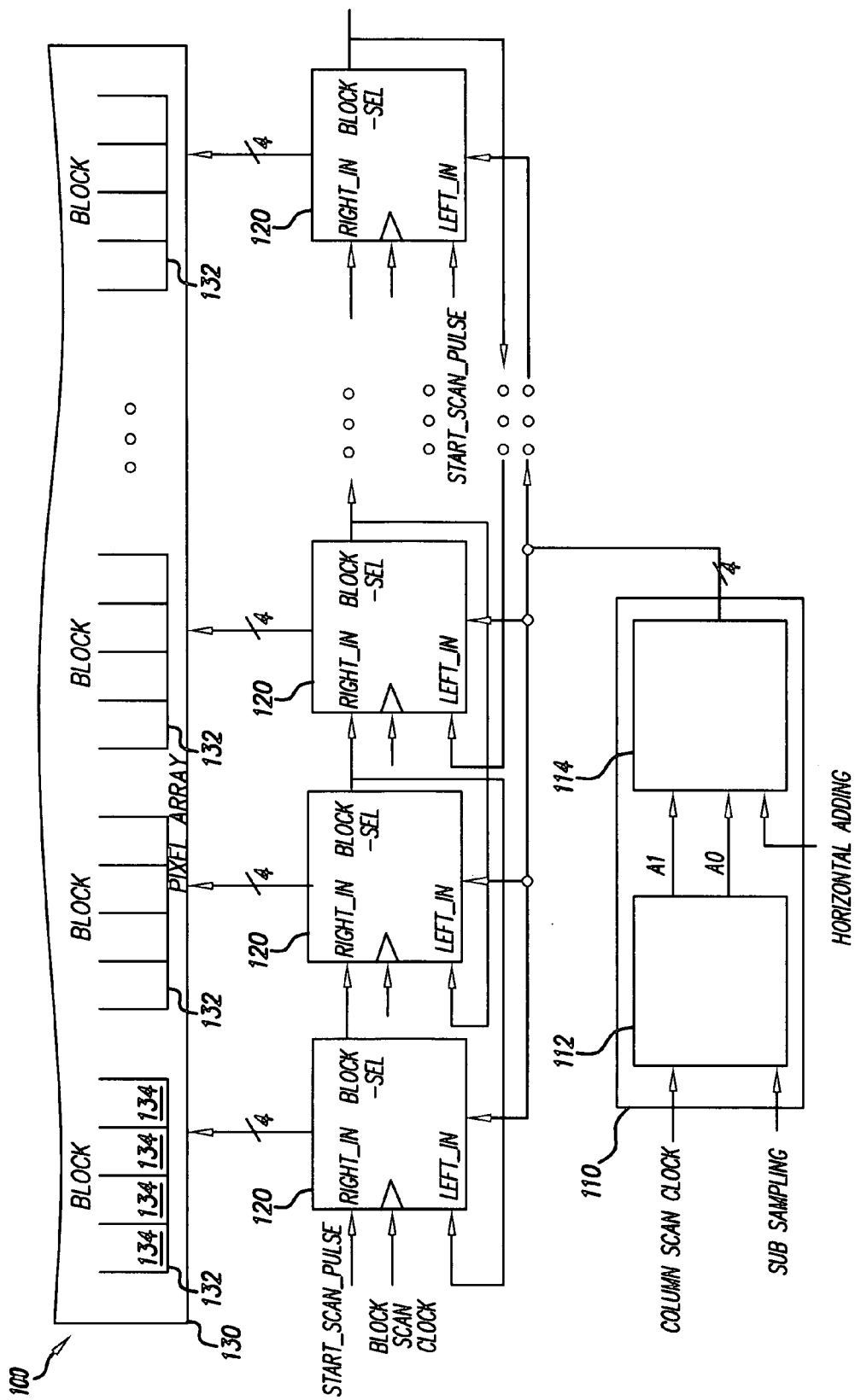
FIG. 1 is a top-level block diagram of an example horizontal scan circuit for a CMOS image sensor used in accordance with the present invention.

In the following detailed description of exemplary embodiments of the invention, reference is made to the accompanied drawings, which form a part hereof, and which is shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected, or an indirect connection through one or more passive or active intermediary devices. The term "circuit" means either a single component or a multiplicity of components, either active and/or passive, that are coupled together to provide a desired function. The term "signal" means at least one current, voltage, or data signal. Referring to the drawings, like numbers indicate like parts throughout the views.

CMOS image sensors typically comprise pixel cells (i.e., pixels) that are arranged in an array. Each pixel typically comprises a reset circuit and a photodiode, which are used to produce a pixel signal level in accordance with the intensity of incident light. In operation, the reset circuit is used to charge the pixel to a highest level. Exposure of the photodiode to light causes the photodiode to produce a stray current, which reduces the charge of the pixel over time. Thus, the pixel signal level is integrated by exposing the pixel to light. The amount of integration is dependent upon the intensity of incident light upon the pixel and the sensitivity of the pixel.

Additionally, many CMOS image sensors generate pixel signal levels for each pixel by subtracting an integrated pixel signal level from a sampled reset level of the same pixel. In practice, the reset level is sampled shortly after the pixel has been reset. A storage element (such as a capacitor) is used to store the sampled reset level. Ideally, the sampled pixel level represents the level of the pixel when it has been reset to the highest level. The pixel is allowed to integrate for an exposure period. After the exposure period, the integrated pixel signal level is sampled (by a storage element such as a capacitor). The integrated pixel signal level is subtracted from the sampled reset level to produce the pixel signal level.

A horizontal scan circuit in accordance with the present invention comprises a column selector and a plurality of block selectors. A column selector is used to address particular columns of pixels within blocks. A block selector is used to select a particular block and to select the particular columns of the selected block that are addressed by the column selector. Each block selector typically comprises a single D-type flip-flop that is associated with a block of pixel columns. The block selectors are arranged such that the blocks can be scanned from left-to-right or right-to-left. The column selector is further arranged to provide sub-sampling and horizontal adding functions. The use of block selectors reduces the number of relatively large D-type flip-flops (which conserves die area) and reduces the parasitic capacitance associated with the otherwise required relatively large number of inputs of the column selection circuit drivers.

An electronic imaging circuit comprising a horizontal scan circuits in accordance with the present invention typically operates by focusing an image upon a pixel array. The horizontal scan circuit is used to select various pixels from within the pixel array. The selected pixels within the pixel array can be sampled by a charge amplifier for further use by the imaging system.

In various embodiments of the present invention, the horizontal scan circuit can operate in three modes. In a normal mode, each column within a block of can be sequentially selected (i.e., scanned) from either left-to-right or from right-to left. In the sub-sampling mode (such as when used in RGB-type sampling of color images), scanning is accomplished by selecting sequentially, for example, every other column in the pixel array. In a horizontal adding mode, the charge produced by adjacent columns can be combined before sampling by the charge amplifier.

FIG. 1 is a top-level block diagram of an example horizontal scan circuit for a CMOS image sensor used in accordance with the present invention. Horizontal scan circuit 100 includes column selector 110 and block selector 120, which are used for selecting various pixel columns within, for example, pixel array 130. In an embodiment, column selector 110 comprises asynchronous counter 112 and decoder 114.

Column selector 110 is arranged to select various pixel columns in response to mode selection signals and a clock signal. In an embodiment, counter 112 is arranged to generate an encoded signal (A0 and A1) for sequentially addressing columns within a block. Fewer columns with in the block can be selected in response to the assertion of the sub-sampling mode signal. Decoder 114 is arranged to generate column address signals in response to the encoded column address signal. Decoder 114 can further simultaneously select multiple columns in response to a horizontal adding signal.

Column selector 110 provides column selection signals to each block selector 120. The plurality of block selectors 120 form a bidirectional scan chain for selecting, for example, a single block 132 of pixel columns 134 with pixel array 130. The scan chain is initialized by clearing flip-flops that are associated with the chain. For a rightwards direction scan, the leftmost flip-flop operates in response to a scan_start_pulse signal applied to the "right_in" input of the leftmost flip-flop. For a leftwards direction scan, the rightmost flip-flop operates in response to a scan_start_pulse signal applied to the "left_in" input of the leftmost flip-flop In response to a block scan clock signal and direction signals, blocks 132 that are adjacent to a selected block are selected in a first direction along the scan chain. The direction can be reversed in response to the direction signals. When a particular block selector 120 is selected, the selected block selector 120 selects one or more pixel columns 134 within the selected block 132 in response to the column address signals.

In the present example, pixel columns 134 within pixel array 130 are grouped into blocks of four columns each, although other block sizes are possible. Using other block sizes can require changes in circuitry, such as in column selector 110. (For clarity, the Figure is not to scale and not all pixel columns 132, for example, are shown.)

Figure 2:
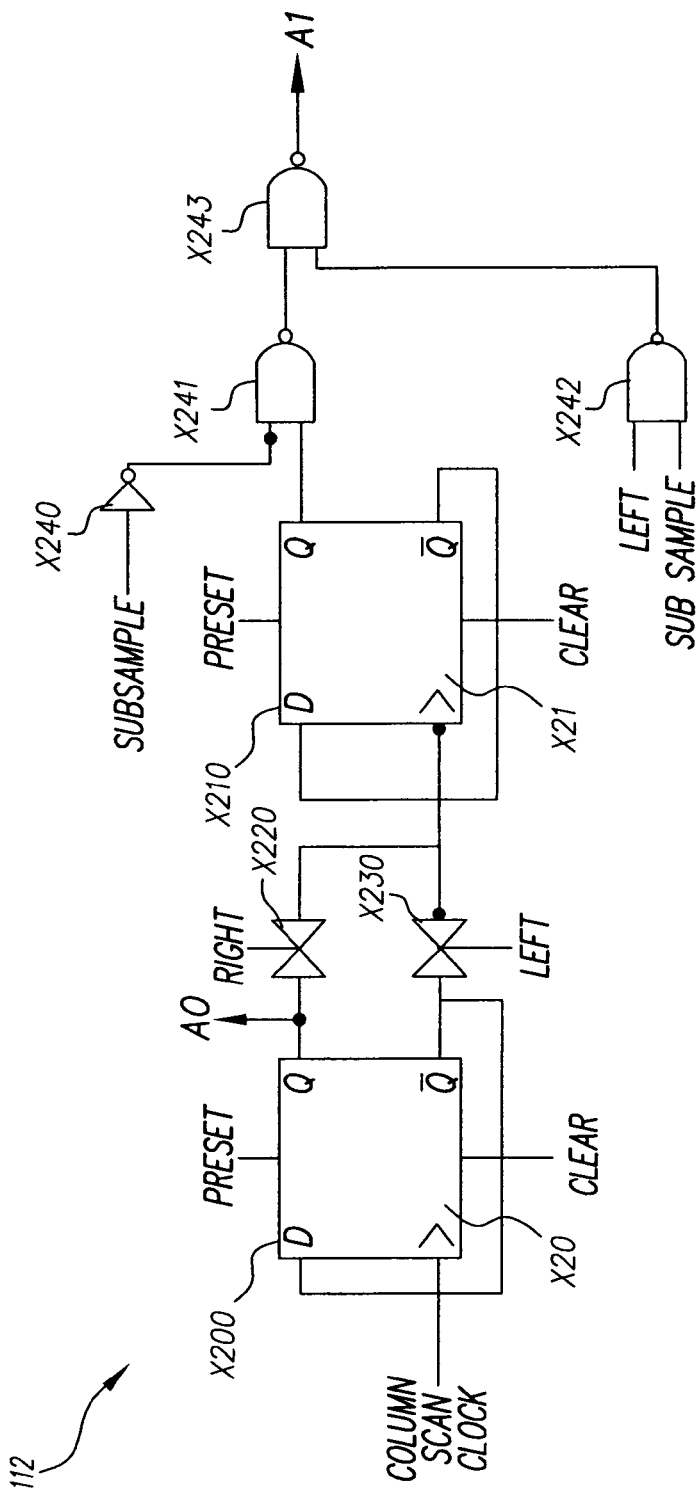
FIG. 2 is a schematic diagram of an example asynchronous counter of a column selector in accordance with the present invention.

FIG. 2 is a schematic diagram of an example asynchronous counter of a column selector in accordance with the present invention. Column selector counter 112 comprises D-type flip-flops X200 and X210, transmission gates X220 and X230, and logic gates X240-X243. Counter 112 is used to generate the encoded column address signal for sequentially addressing columns within a block. Counter 112 typically has a modulus that is equal to the number of the associated pixel columns in each block In response to a column scan clock signal counter 112 generates the sequence "00 01 10 11" for a rightwards direction scan and generates the sequence "11 10 01 00" for a leftwards direction scan. For a rightwards direction scan, flip-flops X200 and X210 count upwards by initializing the registers (e.g. by presetting the flip-flops) to "11" and clocking flip-flop X200 with the column scan clock signal.

For a leftwards direction scan, flip-flops X200 and X210 count downwards by initializing the registers to "00" and clocking flip-flop X200 with the column scan clock signal. The polarity of the clock signal for flip-flop X210 is inverted during downwards counting by enabling transmission gate X230 and disabling transmission gate X220.

In sub-sampling mode, the output "A1" of counter 112 is forced to "0" during a rightwards direction scan. During a leftwards direction scan, the output A1" of counter 112 is forced to "1." Thus the sequence generated in a rightwards direction scan in sub-sampling mode is "00 01" and the sequence generated in a leftwards direction scan in sub-sampling mode is "11 10".

Figure 3:
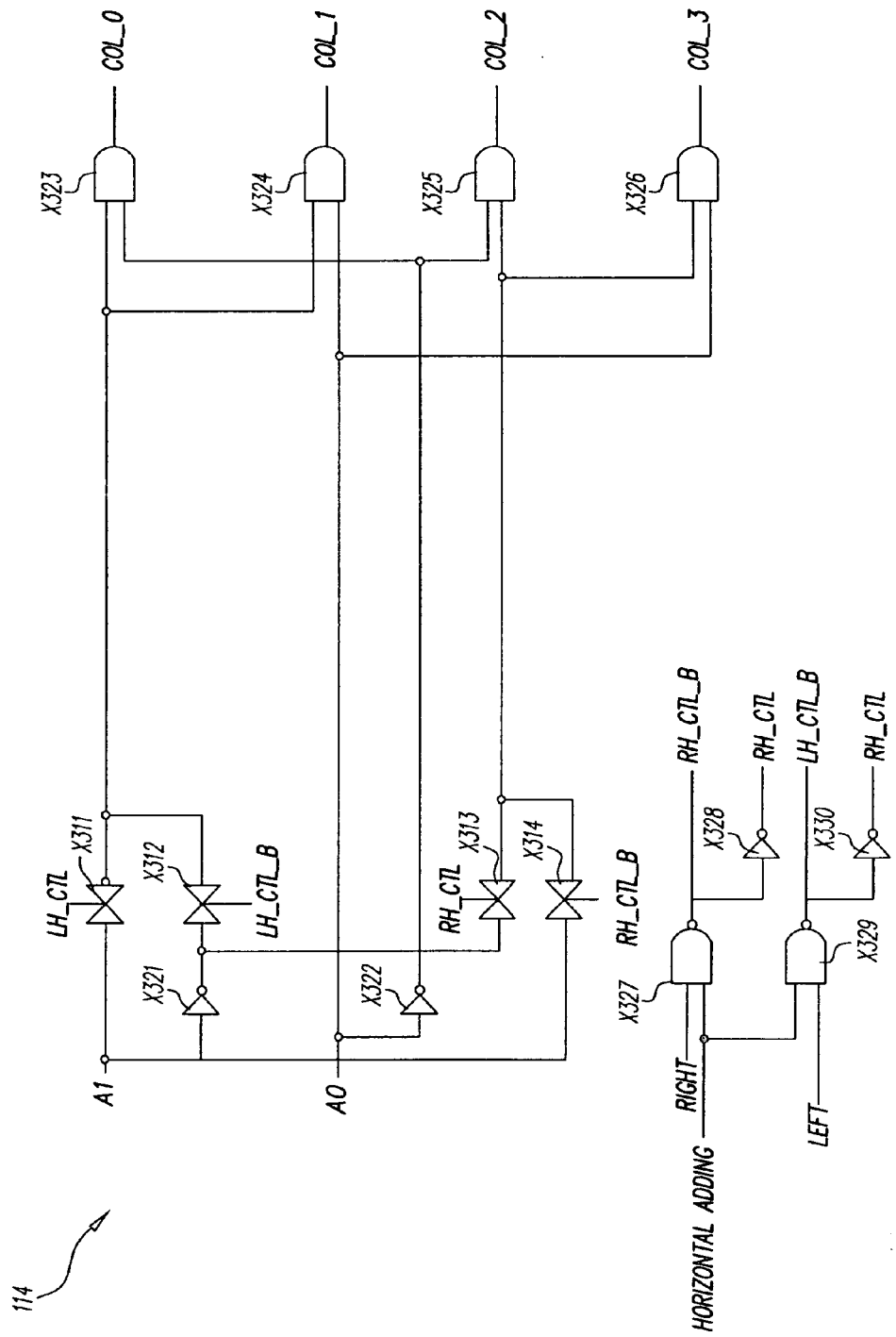
FIG. 3 is a schematic diagram of an example decoder of a column selector in accordance with the present invention.

FIG. 3 is a schematic diagram of an example decoder of a column selector in accordance with the present invention. Decoder 114 comprises transmission gates X31-X314 and logic gates X 321-X330. Decoder 114 is used to generate column address signals in response to the encoded column address signal. Logic gates X323-X326 have outputs that are sized to drive high, parasitic loads that are associated with the inputs of the plurality of block selectors 120.

In the present example, decoder 114 is a 2-to-4 decoder that generates four individual column address signals (where pixel columns are grouped into blocks of four columns each). Thus, in normal and sub-sampling modes, only one of the four individual column address signals is selected.

In horizontal adding mode, a plurality of the four individual column address signals can be selected simultaneously. In the present example, the polarity of certain bits from within the encoded column address signal can be inverted such that multiple column address signals can be simultaneously selected by properly passing the signal through transmission gates X311-X314. In horizontal adding mode during a rightwards direction scan, signal A1 is inverted and applied to an input of logic gates X323-X326. In horizontal adding mode during a leftwards direction scan, signal A1 is applied (non-inverted) to an input of logic gates X323-X326.

Accordingly, signals col_0 and col_2 are selected simultaneously (followed by col_1 and col_3 being selected simultaneously) in horizontal adding mode during a rightwards direction scan. Signals col_3 and col_1 will be selected simultaneously (followed by col_2 and col_0 being selected simultaneously) in horizontal adding mode during a leftward direction scan. When the input sequence is "00 01" in horizontal adding mode, signals col_0 and col_2 are selected simultaneously, followed by signals col_1 and col_3 being selected simultaneously. When the input sequence is "11 10" in horizontal adding mode, signals col_3 and col_1 are selected simultaneously, followed by signals col_2 and col_0 being selected simultaneously.

The output of decoder 114 is coupled to a plurality of block selectors 120. Accordingly, logic gates X323-X326 have outputs that are sized to drive high, parasitic loads that are associated with the inputs of the plurality of block selectors 120.

Figure 4:
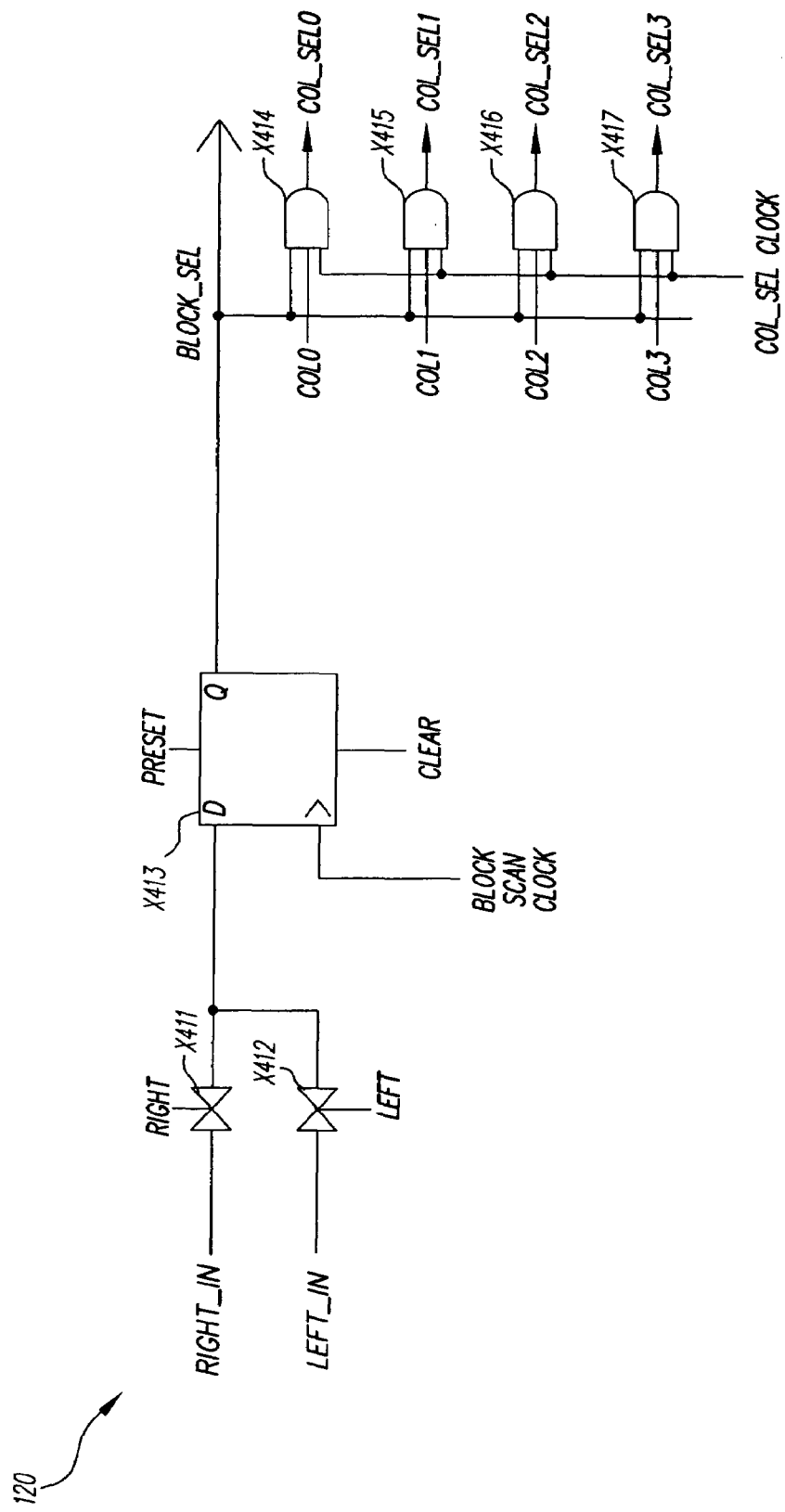
FIG. 4 is a schematic diagram of an example block selector in accordance with the present invention.

FIG. 4 is a schematic diagram of an example block selector in accordance with the present invention. Block selector 120 comprises transmission gates X411-X412, D-type flip-flop X413, and logic gates X414-X417. Block selector 120 is used to select a particular block of pixel columns and to select the particular columns of the selected block that are addressed by column selector 110.

Flip-flop X413 operates in response to the block scan clock and generates the block_sel signal, which is used to select the block of pixel columns that is associated with a given block selector. The frequency of the block scan clock is typically equal to the frequency of the column scan clock divided by the number of pixel columns per block. In the illustrated embodiment the block scan clock is one-fourth the frequency of the column scan clock.

The input of flip-flop X413 is coupled to the block_sel signal that is generated by one of the adjacent block selectors 120 (or the scan_start pulse signal). During a rightwards direction scan, the block_sel signal from the block selector 120 to the right is coupled to the input of flip-flop X413.

During a leftwards direction scan, the block_sel signal from the block selector 120 to the left is coupled to the input of flip-flop X413.

Block selector 120 provides four column selection signals (e.g., col_sel0-col_sel3) that are used to select pixel columns in the block that is associated with a particular block selector. The outputs are generated in response to the four individual column address signals (col_0-col_3), the col_sel clock, and the block_sel signal of the instant block selector. The col_sel clock is typically the same frequency as the column scan clock, although the phase and duty cycle of the col_sel clock may be adjusted to accommodate pixel scanning timing requirements.

Various embodiments of the invention are possible without departing from the spirit and scope of the invention. For example, block sizes of eight pixel columns per block may be used. Accordingly, a 3-bit asynchronous counter and 3-8 decoder may be employed by the column selector 110.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A horizontal scan circuit for a pixel array, comprising:
   pixel columns within the pixel array that are arranged in blocks such that at least two pixel columns are associated with each block;
   a column selector that is configured to receive a column scan clock, a direction mode signal, a subsample signal, and a horizontal adding signal and generate a column address signal for addressing the at least two pixel columns within each of the blocks; and
   a scan chain of block selectors that is configured to sequentially select blocks in a first scan direction in response to a block scan clock, and during the period in which a particular block is selected, to select particular pixel columns of the particular selected block, wherein each block selector of the scan chain is associated with an individual block.

2. The circuit of claim 1, wherein the pixel columns are arranged in blocks such that each block has the same number of associated pixel columns.

3. The circuit of claim 2, wherein the column selector comprises an asynchronous counter and a decoder having a modulus that is equal to the number of the associated pixel columns in each block.

4. The circuit of claim 3, wherein the column selector is further configured to operate in a sub-sampling mode wherein not all of the pixel columns within a block are selected in response to the column scan clock, the direction mode signal, and the subsample signal.

5. The circuit of claim 3, wherein the column selector is further configured to operate in a horizontal adding mode wherein the pixel columns are simultaneously selected in response to the direction mode signal and the horizontal adding signal.

6. The circuit of claim 1, wherein the column scan clock has a frequency that is at least two times greater than the column scan clock.

7. The circuit of claim 1, wherein the scan chain of block selectors is further configured to sequentially select blocks in a first and a second scan direction in response to a direction mode signal.

8. A method for horizontally scanning a pixel array, comprising:
   arranging in blocks a plurality of pixel columns within the pixel array such that at least two pixel columns are associated with each block;
   receiving a column scan clock signal, a direction mode signal, a subsample signal, and a horizontal adding signal and generating in response a column address signal for addressing the at least two pixel columns within each of the blocks;
   sequentially selecting blocks in a first scan direction in response to a block scan clock; and
   selecting particular pixel columns of the particular selected block during the period in which a particular block is selected.

9. The method of claim 8, wherein the pixel columns are arranged in blocks such that each block has the same number of associated pixel columns.

10. The method of claim 9, wherein the column scan clock has a frequency that is at least two times greater than the blockscan clock.

11. The method of claim 10, wherein the column address signal is generated having a modulus that is equal to the number of the associated pixel columns in each block.

12. The method of claim 8, wherein not all of the pixel columns within a block are selected in response to the column scan clock, the direction mode signal, and the subsample signal.

13. The method of claim 8, wherein a plurality of pixel columns are simultaneously selected in response to the direction mode signal and the horizontal adding signal.

14. A circuit for horizontally scanning a pixel array, comprising:
   pixel columns within the pixel array that are arranged in blocks such that at least two pixel columns are associated with each block;
   means for generating a column address signal for addressing the at least two pixel columns within each of the blocks;
   means for sequentially selecting blocks in a first scan direction in response to a block scan clock and a direction mode signal; and
   means for selecting particular pixel columns of the particular selected block during the period in which a particular block is selected.

15. The circuit of claim 14, wherein the pixel columns are arranged in blocks such that each block has the same number of associated pixel columns.

16. The circuit of claim 15, wherein the column scan clock has a frequency that is at least two times greater than the block scan clock.

17. The circuit of claim 16, wherein the column address signal is generated having a modulus that is equal to the number of the associated pixel columns in each block.

18. The circuit of claim 14, wherein not all of the pixel columns within a block are selected in response to the column scan clock, the direction mode signal, and the subsample signal.

19. The circuit of claim 14, wherein a plurality of pixel columns are simultaneously selected in response to the direction mode signal and the horizontal adding signal.

20. The circuit of claim 14, further comprising means for sequentially selecting blocks in a first and a second scan direction in response to a direction mode signal.

* * * * *